Figures 1, 2, 3:
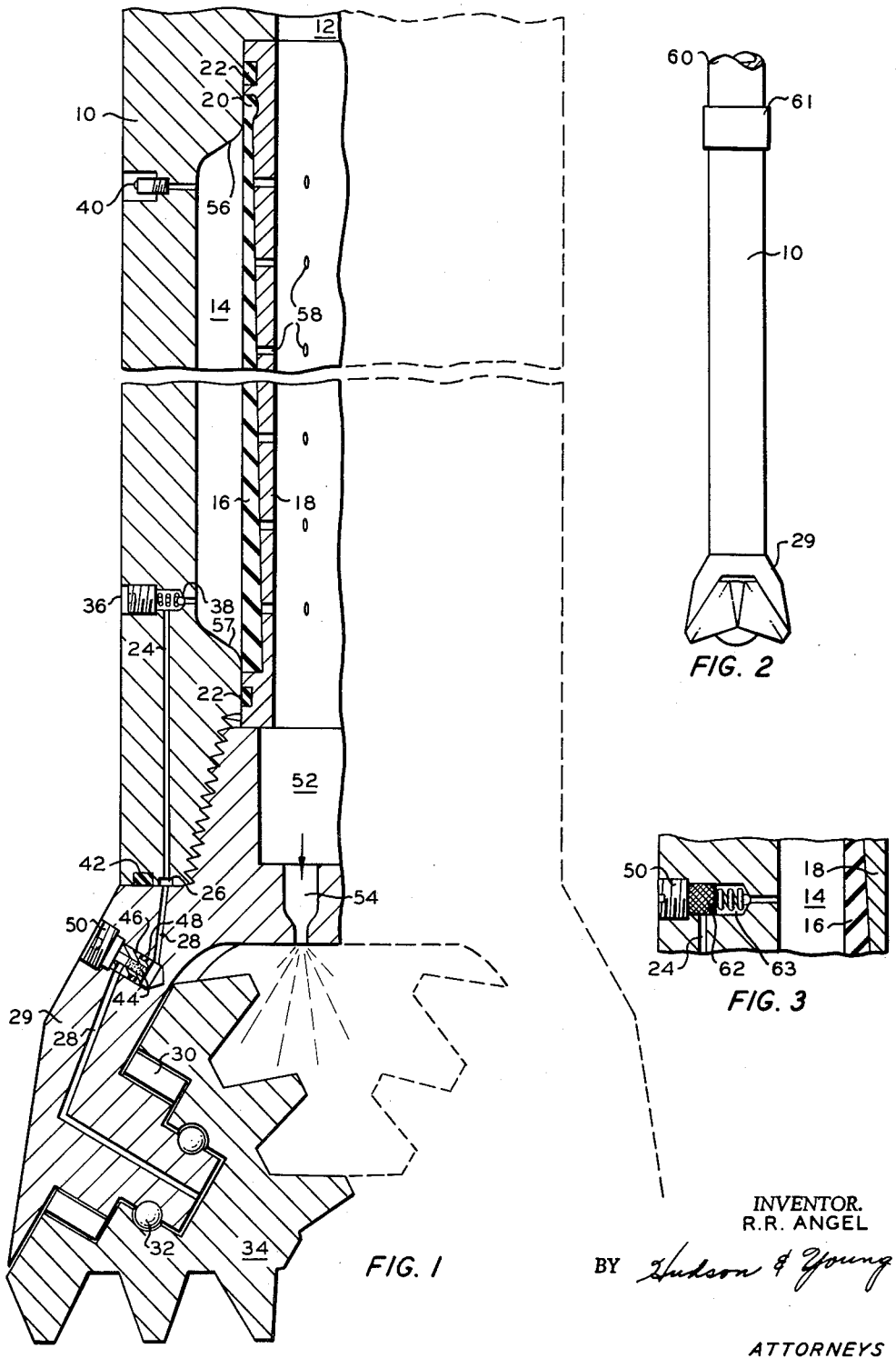

Aug. 7, 1962  R. R. ANGEL  3,048,230
LUBRICATOR FOR ROCK BIT
Filed May 25, 1959

INVENTOR.
R.R. ANGEL
BY Hudson & Young
ATTORNEYS

United States Patent Office 3,048,230
Patented Aug. 7, 1962

3,048,230
LUBRICATOR FOR ROCK BIT
Richard R. Angel, Houston, Tex., assignor to Phillips Petroleum Company, a corporation of Delaware
Filed May 25, 1959, Ser. No. 815,608
1 Claim. (Cl. 175—228)

This invention relates to apparatus for lubricating the bearings of an earth boring drill bit used in drilling for oil, water, sulfur, ores, and the like.

Rolling cutter rock bits have come into wide use in the drilling of deep boreholes in the search for oil and other valuable deposits in the earth. In using bits of this type, adequate means for properly lubricating the bearings of the rolling cutters is necessary in order to prevent freezing of the bearings before the teeth of the cutters wear out and the failure of the drill bit with the failure of the bearings. Maintaining proper metallurgy and design with relation to rock bits has been a difficult problem thru the years. Better cutters have shown deficiencies in bearing design; and better bearings have shown deficiencies in the cutters. At the present time, because of higher rotating speeds and increased weight on the bit, bearings have been failing while the cutter teeth are still in relatively good condition. Hence, there is a definite need for increasing bearing life in the art of drilling deep boreholes.

To illustrate the necessity of increasing bearing life and, therefore, bit life, as a prerequisite to the reduction of drilling costs, reference is made to the fact that in drilling deeper wells, roughtly ⅓ of the total time is spent in replacing bits and only ⅔ of the time in productive drilling. Hence, a 50 percent improvement in bit life would result in a significant reduction in the cost of drilling a well. This invention is concerned with a drill collar sub for lubricating the bearings of roller bits during drilling operations.

Accordingly, it is an object of the invention to provide a novel drill bit lubricating device which lubricates the bearings of the bit during drilling operations. A further object is to provide a novel device which increases the life of drill bits. Another object is to provide a drilling accessory which decreases the time spent in making hole. Other objects of the invention will become apparent upon consideration of the accompanying disclosure.

The invention comprises a drill collar sub having an annular lubricating chamber around the bore of the sub, the inner wall of the lubricating chamber comprising an inner perforate sleeve and an outer imperforate elastic sleeve sealing off the chamber and rendering the elastic sleeve sensitive to differential drilling fluid pressure between that in the drill string and that in the surrounding annulus so that it forces lubricant from the chamber thru a lubricant duct leading from the lower end of the lubricant chamber to the lower end of the sub for alignment with a lubricant duct in the bit leading to the bearings of the roller bits. A porous plug or screen is positioned in the lubricant duct so as to control the rate of flow of lubricant and screen out any solid foreign material which may have gotten into the lubricant chamber when filled with lubricant.

A more complete understanding of the invention will be had by reference to the accompanying schematic drawing of which FIGURE 1 is an elevation in partial quarter section of a preferred embodiment of the drill collar sub with a drill bit attached thereto; FIGURE 2 is an elevation of the lower end of a drill string to which is attached the sub of FIGURE 1 along with a tri-cone bit; and FIGURE 3 is a fragmentary cross section thru the wall of a drill collar sub illustrating another embodiment of the invention.

Referring to FIGURE 1, a drill collar sub 10 having a bore 12 is provided with an elongated lubricant chamber 14 in the form of an annulus in the wall of the bore. The lubricant chamber is completely sealed off from the bore of the sub by means of an elastic imperforate sleeve 16 covered by a perforate rigid sleeve 18. The ends of elastic sleeve 16 are either bonded along its end sections to sleeve 18 or the end sections may be expanded inwardly, as at 20, to fit into a depression in the inner sleeve 18 which holds the ends of the elastic sleeve 16 in sealed relation with the sub. Sleeve 18 is provided with seal rings 22 to seal the sleeve at both ends with sub 10.

Sub 10 is provided with a lubricant duct 24 leading from the lubricant chamber to the lower end of the sub where it opens into an annular groove 26 which serves as a distributing channel for feeding lubricant to each of the lubricant ducts 28 in bit 29 connected with the bearings 30 and 32 of the roller bits 34. A check valve 36 in duct 24 comprises a spring actuated ball 38 which functions to prevent back-flow of drilling fluid into the ducts from the bit. This feature of the device is important in the event drilling fluid is pumped down the annulus and up the drill string or at any time when the lubricant chamber is not full and the pressure in the annulus exceeds the pressure in the drill string. A valved connection 40 for filling the lubricant chamber is also provided.

A rock bit 29 of the tri-cone type is threaded onto the lower end of sub 10 and sealed therewith by means of sealing ring 42. A porous plug or screen 44 in lubricant duct 28 functions as a filter or screen and also as an orifice or choke to control the flow of lubricant to the cone roller bearings 30 and ball bearings 32. Plug 44 is positioned in an outer plug 46 which is sealed by means of sealing ring 48 to the surrounding channel of the duct. A cap screw 50 retains the sealing plug assembly in position.

Bit core 52 connects with several jets 54 (one of which is shown) which deliver high velocity drilling fluid to the cutters and to the bottom of the hole. This construction causes a substantial pressure drop across the jet so that a pressure differential in favor of the pressure in the drill string of a few hundred to a thousand p.s.i.g. or more exists during the drilling process. This effective pressure differential actuates elastic sleeve 16 causing same to bulge radially outwardly and to force lubricant thru the duct system to the bearings of the roller cones, thereby lubricating same during drilling. Elastic sleeve 16 is preferably tapered along its length with the thick end adjacent the duct outlet and the thin end adjacent the upper end of the lubricant chamber. When fabricated in this manner, the actuating pressure within the drill string produces a bulge in the elastic sleeve at the thin end and, as the pressure is applied and lubricant is dispensed to the bearings, the bulge progressively moves toward the thick end of the sleeve, expelling thereby the lubricant progressively down the chamber. The upper and lower ends of chamber 14 are smoothly curved as at 56 and 57 so as to avoid injuring the elastic sleeve as it is expanded to the lubricant chamber.

Sleeve 18 is preferably fabricated of metal and is provided with holes 58 drilled at intervals circumferentially and longitudinally of the sleeve. Sleeve 16 is of course imperforate and is fabricated of rubber, preferably butyl rubber or other synthetic rubber which is impervious to lubricants; however, any material which is sufficiently elastic and relatively unaffected by lubricants and drilling fluids may be utilized to fabricate this sleeve.

Referring to FIGURE 2, drill collar sub 10 is attached to the lower end of drill string 60 by collar 61, and bit 29 is attached to the lower end of the sub. Sub 10 may be of any desired length to provide the necessary lubricant capacity for long periods of drilling.

FIGURE 3 shows a combination screen or porous plug and check valve in the wall of sub 10 in lubricant duct 24, such as in the position shown for check valve 36 in FIGURE 1. Positioning the screen, plug, orifice, or choke in this duct eliminates the necessity of machining the bit at several points in order to control the flow of lubricant to each of the roller cones. In the arrangement shown, a cap screw 50 serves as a retainer for a fine screen 62 and a spring and ball valve 63 in duct 24 leading from chamber 14 to the lower end of the sub.

The lubricant device functions as long as there is lubricant in chamber 14 and there is a pressure differential between the fluid in the drill string and the fluid in the annulus with the greater pressure in the drill string. This means that during drilling or making of hole, drilling fluid is being circulated under substantial pressure so as to jet drilling fluid thru jets 54 and there is a substantial pressure in the drill string above that in the annulus, which as stated before, usually varies from 200 or 300 pounds to 1,000 pounds or more p.s.i.g. The permeable plug, screen, orifice, or choke can be changed for different drilling conditions or as pressure differential in the well between the drill string and the annulus changes materially, thereby controlling the rate of feeding of lubricant to the bearings, within reasonable limits.

The porous plug for controlling rate of flow of lubricant may be fabricated of ceramic material (porous alumina, silica, or silica-alumina), of sintered metals, such as bronze, and of Marlex (trademark of Phillips Petroleum Company for polyethylene). Of course, other porous rigid materials inert in the well ambient may be utilized.

Any flowable lubricant from light greases to light oils may be used in the device of the invention; however, heavy lube oils are most satisfactory.

Certain modifications of the invention will become apparent to those skilled in the art and the illustrative details disclosed are not to be construed as imposing unnecessary limitations on the invention.

I claim:

A drill collar sub comprising in combination a generally cylindrical member having an axial bore, means at one end for attaching to a drill string, and means at the other end for attaching to a drill head; an elongated annular recess in the wall of said bore intermediate its ends; a perforate rigid radially inner sleeve and an imperforate elastic radially outer sleeve covering said recess, the ends of said sleeves being sealed to said member to form a sealed lubricant chamber with the wall of said recess, said elastic sleeve being displaceable by fluid pressure in said bore toward the wall of said recess to expel lubricant from said chamber; a lubricant duct extending from said chamber to the drill head end of said member adapted to connect with a lubricant duct in a drill head, said duct extending radially from said chamber into the inner end of an expanded hole drilled radially into the outer wall of said sub from its periphery and said duct continuing from an intermediate section of said drilled hole longitudinally of said sub to the end thereof; a ball-spring check valve in the inner end of said drilled hole closing the section of duct leading from said chamber to flow into said chamber from said duct; a porous, flow control plug in said hole covering the entrance to the outgoing section of duct and providing a biasing surface for the spring of said valve; and means for filling said chamber with lubricant.

References Cited in the file of this patent

UNITED STATES PATENTS

| | | |
|---|---|---|
| 1,136,134 | Hughes | Apr. 20, 1915 |
| 1,238,757 | Gardner | Sept. 4, 1917 |
| 1,334,632 | Pickin | Mar. 23, 1920 |
| 1,816,203 | Behnke | July 28, 1931 |
| 2,105,160 | Piquerez | Jan. 11, 1938 |
| 2,880,970 | Swart | Apr. 7, 1959 |

FOREIGN PATENTS

| | | |
|---|---|---|
| 1,041,890 | Germany | Oct. 30, 1958 |

UNITED STATES PATENT OFFICE

CERTIFICATE OF CORRECTION

Patent No. 3,048,230                          August 7, 1962

Richard R. Angel

It is hereby certified that error appears in the above numbered patent requiring correction and that the said Letters Patent should read as corrected below.

Column 1, line 68, and column 2, line 29, for "tri-cone" read -- three-cone --.

Signed and sealed this 10th day of September 1963.

SEAL)
Attest:

ERNEST W. SWIDER
Attesting Officer

DAVID L. LADD
Commissioner of Patents